United States Patent
Klesyk

(10) Patent No.: US 10,596,914 B2
(45) Date of Patent: Mar. 24, 2020

(54) LOW POWER PROXIMITY DETECTION APPARATUS

(71) Applicant: Lear Corporation, Southfield, MI (US)

(72) Inventor: Krzysztof Klesyk, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 924 days.

(21) Appl. No.: 14/993,712

(22) Filed: Jan. 12, 2016

(65) Prior Publication Data

US 2017/0197512 A1  Jul. 13, 2017

(51) Int. Cl.
*B60L 53/00* (2019.01)
*B60L 53/60* (2019.01)
*B60L 11/18* (2006.01)

(52) U.S. Cl.
CPC ........... *B60L 53/00* (2019.02); *B60L 11/1809* (2013.01); *B60L 53/60* (2019.02); *B60L 2250/10* (2013.01); *B60L 2250/16* (2013.01); *Y02T 10/7005* (2013.01); *Y02T 10/7072* (2013.01); *Y02T 10/92* (2013.01); *Y02T 90/121* (2013.01); *Y02T 90/128* (2013.01); *Y02T 90/14* (2013.01); *Y02T 90/163* (2013.01)

(58) Field of Classification Search
CPC .. B60L 11/1809; B60L 11/1801; B60L 53/00; B60L 53/60; B60L 58/00; B60L 58/10; B60L 58/12; B60L 2250/16; B60L 2250/10; B60Y 2300/91; Y02T 90/14; Y02T 90/121; Y02T 90/163; Y02T 90/128; Y02T 10/7005; Y02T 10/7072; Y02T 10/92; H02J 7/04; H02J 7/0004; H02J 7/0008; H02J 7/0081
See application file for complete search history.

(56) References Cited

U.S. PATENT DOCUMENTS

| | | | | |
|---|---|---|---|---|
| 3,794,905 A | * | 2/1974 | Long | H02J 7/0081 320/161 |
| 4,240,021 A | * | 12/1980 | Kashima | G04C 10/02 136/291 |
| 4,418,310 A | * | 11/1983 | Bollinger | H02J 7/0081 320/149 |
| 5,304,916 A | * | 4/1994 | Le | H02J 7/0068 320/131 |
| 5,352,967 A | * | 10/1994 | Nutz | H02J 7/0086 320/160 |

(Continued)

OTHER PUBLICATIONS

Chinese Office Action for Application No. 201611100392.4, dated Jun. 18, 2019, 8 pages.

*Primary Examiner* — Alessandro V Amari
*Assistant Examiner* — Kendrick X Liu
(74) *Attorney, Agent, or Firm* — Brooks Kushman P.C.

(57) ABSTRACT

A proximity detection apparatus including a detection circuit is provided. The detection circuit is configured to receive a proximity signal indicative of a first voltage level and a reference signal indicative of a second voltage level and to receive a wake up signal at predetermined intervals. The detection circuit is further configured to compare the first voltage level to the second voltage level in response to the wake up signal and to generate a first output indicative of an external power source being electrically coupled to a vehicle to charge one or more batteries in the vehicle based on the comparison of the first voltage level to the second voltage level.

16 Claims, 3 Drawing Sheets

(56) References Cited

U.S. PATENT DOCUMENTS

| | | | |
|---|---|---|---|
| 5,814,972 A * | 9/1998 | Shimada | H02J 9/061 |
| | | | 320/132 |
| 6,437,460 B1 * | 8/2002 | Theofanopoulos | ........................... |
| | | | B60L 11/1809 |
| | | | 307/10.1 |
| 8,305,033 B2 | 11/2012 | Cavanaugh | |
| 8,749,198 B2 | 6/2014 | Klesyk | |
| 2010/0228413 A1 | 9/2010 | Fujitake | |
| 2011/0216451 A1 | 9/2011 | Haines et al. | |
| 2012/0032634 A1 | 2/2012 | Cavanaugh | |
| 2012/0268065 A1 | 10/2012 | Klesyk | |
| 2013/0119931 A1 | 5/2013 | Klesyk | |
| 2013/0120889 A1 | 5/2013 | Klesyk | |
| 2013/0141041 A1 | 6/2013 | Hein et al. | |
| 2013/0162208 A1 * | 6/2013 | Ohnuki | H02J 7/007 |
| 2013/0175988 A1 | 7/2013 | Ghabbour et al. | |
| 2013/0176002 A1 | 7/2013 | Ghabbour et al. | |
| 2015/0352967 A1 * | 12/2015 | Timpf, Jr. | B60L 3/0084 |
| | | | 320/109 |

\* cited by examiner

LOW POWER PROXIMITY DETECTION APPARATUS

TECHNICAL FIELD

Aspects of the present disclosure provide a low power proximity circuit (or apparatus) in connection with various battery charging applications.

BACKGROUND

U.S. Pat. No. 8,305,033 ("the '033 patent") to Cavanaugh discloses a proximity detection circuit suitable for use with an on-board vehicle charger, such as but not limited to the type of charges used within hybrid and hybrid electric vehicles, to facilitate current conservation during a period of time when it is unnecessary or otherwise undesirable for the on-board charger to test for connection of a cordset or other connection used to connect the on-board charger to a charging station or other current source.

SUMMARY

A proximity detection apparatus including a detection circuit is provided. The detection circuit is configured to receive a proximity signal indicative of a first voltage level and a reference signal indicative of a second voltage level and to receive a wake up signal at predetermined intervals. The detection circuit is further configured to compare the first voltage level to the second voltage level in response to the wake up signal and to generate a first output indicative of an external power source being electrically coupled to a vehicle to charge one or more batteries in the vehicle based on the comparison of the first voltage level to the second voltage level.

A proximity detection apparatus including an event storage circuit and a detection circuit is provided. The event storage circuit is configured to indicate that an external power source is coupled to a vehicle. The detection circuit is configured to receive a proximity signal indicative of a first voltage level and a reference signal indicative of a second voltage level and to receive a wake up signal at predetermined intervals. The detection circuit is further configured to compare the first voltage level to the second voltage level in response to the wake up signal and to provide a first output indicative of the external power source being electrically coupled to the vehicle to charge one or more batteries in the vehicle to the event storage circuit in response to comparing the first voltage level to the second voltage level.

A proximity detection apparatus including a flip-flop circuit and a detection circuit is provided. The detection circuit is configured to receive a proximity signal indicative of a first voltage level and a reference signal indicative of a second voltage level to receive a wake up signal at predetermined intervals. The detection circuit is further configured to compare the first voltage level to the second voltage level in response to the wake up signal and to provide a first output indicative of the external power source being electrically coupled to the vehicle to charge one or more batteries in the vehicle to the flip-flop circuit in response to comparing the first voltage level to the second voltage level.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
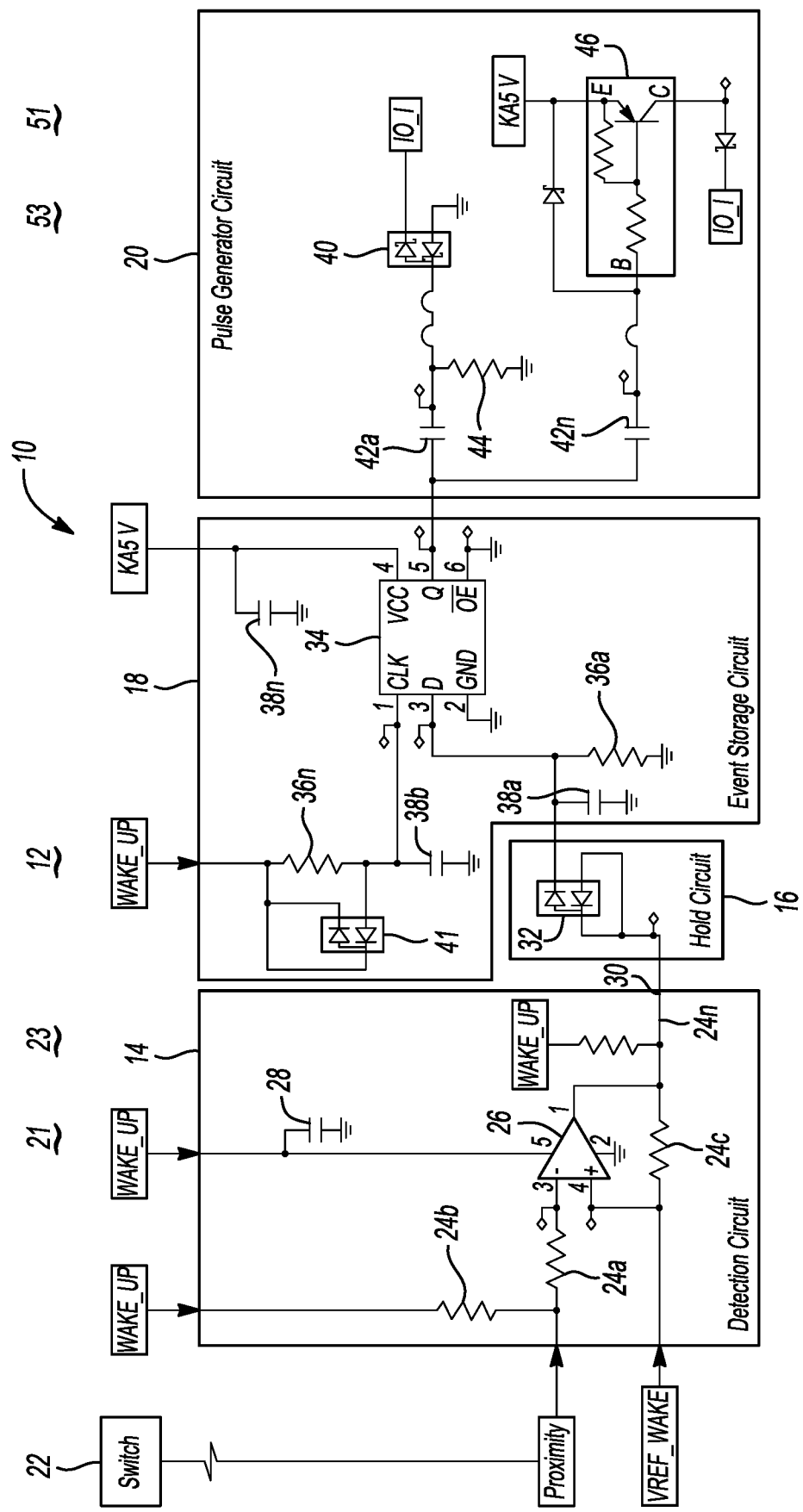
FIG. 1 depicts an apparatus for providing low power proximity detection in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

Proximity detection circuits detect the presence of cordset when plugged into a vehicle (and to an external power supply) to enable vehicle battery charging. Once the proximity detection circuit detects that a cordset is plugged to the vehicle, the proximity detection circuit generates an output to indicate to the vehicle that the vehicle may receive power from an alternating current power source at a residence, commercial establishment, or other charging system. In moments where the cordset is not plugged or operably connected to the vehicle to enable battery charging, it is necessary to power the proximity detection circuit intermittently so that the proximity detection circuit can monitor for the presence of the cordset when other controllers and electrical devices in the vehicle are in a sleep mode. Thus, this condition of powering the proximity detection circuit while the vehicle is in the sleep mode may draw large amounts of quiescent current and consume stored power on one or more batteries on the vehicle. Therefore, there may be a need to provide a low proximity detection circuit that detects the proximity or physical connection of the cordset to the energy power source and to the vehicle while maintaining a low quiescent current to mitigate power consumption of the battery in moments where the battery is not being charged.

FIG. 1 depicts an apparatus 10 for providing low power proximity detection in a vehicle 12 in accordance to one embodiment. The apparatus 10 includes a detection circuit 14, a hold circuit 16, an event storage circuit 18, and a pulse generator circuit 20. A switch 22 is operably connected to the detection circuit 14. The switch 22 provides a signal PROXIMITY that indicates whether a cordset 21 is coupled to the vehicle 12 and to an external power source 23 to the vehicle for charging one or more batteries 53 in the vehicle 12. The cordset 21 may be portable or may be mounted proximate to an electrical outlet on or about an establishment for conditioning power from the electrical outlet and for providing the conditioned power one or more batteries 53 in the vehicle 12.

The detection circuit 14 includes a plurality of resistors 24a-24n, a comparator 26, and at least one capacitor 28. A signal WAKE_UP is provided to the detection circuit 14 for providing voltage at predetermined intervals. In general, the detection circuit 14 is not powered all of the time (or continuously) when the vehicle 12 is in the OFF state (e.g., vehicle ignition is OFF). In one example, the signal WAKE_UP is applied every 256 ms and may be applied for a period of 400 μs. This condition aids in reducing current draw at the apparatus 10 when the vehicle 12 is in the OFF state. The apparatus 10 may provide the signal WAKE_UP from a system basis chip ("SBC") that includes an integrated timer and wake up strobing sensing capability. The SBC may be located in the apparatus 10 or may be positioned in an electronic vehicle controller in the vehicle 12.

When an operator connects the cordset 21 to the vehicle 12 and to the external power source 23 to the vehicle 12, the switch 22 provides a low voltage on the signal PROXIMITY to the comparator 26. The comparator 26, when strobed with a high voltage on the signal WAKE_UP (e.g., power is applied at the predetermined interval when the vehicle 12 is in a sleep mode or in an awake mode), compares the low voltage (or voltage level) (see PIN 3 on comparator 26) to a reference voltage (or reference signal having another voltage level) (see PIN 4 on the comparator 26) as provided by a signal VREF_WAKE. The signal VREF_WAKE is derived from the signal WAKE_UP and is arranged at a different voltage level than the signal WAKE_UP. A voltage divider (not shown) is arranged to provide the signal VREF_WAKE at a voltage that is different than the signal WAKE_UP. If the comparator 26 determines that the low voltage is less than the reference voltage, then the comparator 26 outputs a high output (e.g., 5V). A pin output 30 of the detection circuit 14 provides the high output to the hold circuit 16.

When the operator disconnects the cordset 21 to the vehicle 12 and/or to the external power source 23 to the vehicle 12, the switch 22 provides a high signal on the signal PROXIMITY to the comparator 26. The comparator 26, when strobed with a high voltage on the signal WAKE_UP (e.g., power is applied at the predetermined interval which reduces quiescent current), compares the high voltage (see PIN 3 on the comparator 26) to the reference voltage (see PIN 4 on the comparator 26) as provided by the signal VREF_WAKE. If the comparator 26 determines that the high voltage is greater than the reference voltage, then the comparator 26 outputs a low output (e.g., 0V). The pin output 30 of the detection circuit 14 provides the low output to the hold circuit 16. In general, the moment in which the cordset 21 is connected to the vehicle 12 and to the external power source 23, the switch 22 transitions to provide a low output and the detection circuit 14 transitions to provide a high output. The moment in which the cordset is disconnected from the vehicle and/or the external power source, the switch 22 transitions to provide a high output and the detection circuit 14 transitions to provide a low output.

The hold circuit 16 includes a diode circuit 32. In one example, the diode circuit 32 may be a Schottky diode. The event storage circuit 18 includes a flip-flop circuit 34, resistors 36a-36n, capacitors 38a-38n, and a diode circuit 40. In one example, the flip-flop circuit 34 may be a D flip-flop. The hold circuit 16 is configured to hold the output received from the detection circuit 14 for a period of time to enable the flip-flop circuit 34 to receive a high voltage on the WAKE_UP to wake up the flip-flop circuit 34 so that the flip-flop circuit 34 receives the output from the detection circuit 14. An input (or clock signal) is provided to the flip-flop circuit 34 (e.g., at input 1 (or CLK) of the flip-flop circuit 34) to detect the state of input "D." The diode circuit 40 ensures that a sharp fall time and a slow rise time for the clock signal that is provided to input 1 of the flip-flop circuit 34. Because the clock signal may be slow, the flip-flop circuit 34 may be susceptible to re-sampling on a falling edge of the clock signal (i.e., for a rising edge triggered flip-flop circuit 34).

In general, the clock signal data (e.g., the data received from the pin output 30 and the hold circuit 16 at the flip-flop circuit 34 (as received at input "D") in on a rising edge. The hold circuit 16 ensures that the data provided to the input D at the flip-flop circuit 34 is present before the rising edge of the clock signal arrives at the input CLK at the flip-flop circuit 34 and further ensures that the data provided to the input D is valid after the clock signal transitions low. For example, the hold circuit 16 stores the output from the detection circuit 14 for a period of time to ensure that the event storage circuit 18, upon wake up, is capable of receiving (or detecting) the output from the detection circuit 14 upon either the switch 22 being disconnected (e.g., no vehicle charging being performed) or the switch 22 being connected (e.g., vehicle charging being performed). For example, the hold circuit 16 sustains the state of information provided to an input "D" during both a rising edge and a falling edge of the clock signal to ensure that the flip-flop circuit 34 provides a valid output at "Q" of the flip-flop circuit 34. In this case, the flip-flop circuit 34 retains the output from the detection circuit 14 and the flip-flop circuit 34 does not retrigger the same event. Because the flip-flop circuit 34 does not retrigger on the same event (i.e., the output, Q stays at the same level until the cordset 31 is disconnected), this condition lowers the quiescent current draw.

The pulse generator circuit 20 includes a diode circuit 40, a plurality of capacitors 42a-42n, and a resistor 44. In one example, the diode circuit 40 may be a Schottky diode. The capacitor 42a (or bypass capacitor) of the pulse generator circuit 20 is operably coupled to an output of the flip-flop circuit 34 which enables the flip-flop circuit 34 to only consume current as the switch 22 transitions from either closed-to-open or open-to-closed. In general, as the output of the detection circuit 14 is fed to the hold circuit 16 and subsequently to the flip-flop circuit 34 at input "D", the flip-flop circuit 34 then provides such an output (i.e., the state of the switch 22 or the proximity detection) to the capacitor 42a of the pulse generator circuit 20. It should be recognized that capacitor 42a provides the output from the flip-flop circuit 34 as a single pulse to the diode circuit 40 and not at a constant level which therefore serves to minimize current consumption (or reduce quiescent current draw) for the event storage circuit 18. The pulse generator circuit 20 provides an output on to one or more microprocessors 51 in the vehicle 12 that the vehicle 12 is being charged if the flip-flop circuit 34 provides a high output (or output, Q from the flip-flop circuit 34 is high).

In general, the diode circuit 40 allows or enables a positive pulse generation. For example, when the flip-flop circuit 34 provides a low output, the remaining diode (i.e., the diode position on top of the diode circuit 40) discharges the capacitor 42a. The output from the diode circuit 40 is transmitted to an input IO_1 of the SBC (or to the other microprocessors 51) that provides periodic strobe synchronized sensing. The capacitor 42n is similar to the capacitor 42a in that the capacitor 42n provides an output (or is discharged) when the flip-flop circuit 34 provides a low output when the cordset 21 is disconnected. An inverting buffer 46 (or switch) is provided to invert a negative pulse into a positive pulse.

Figure 2:
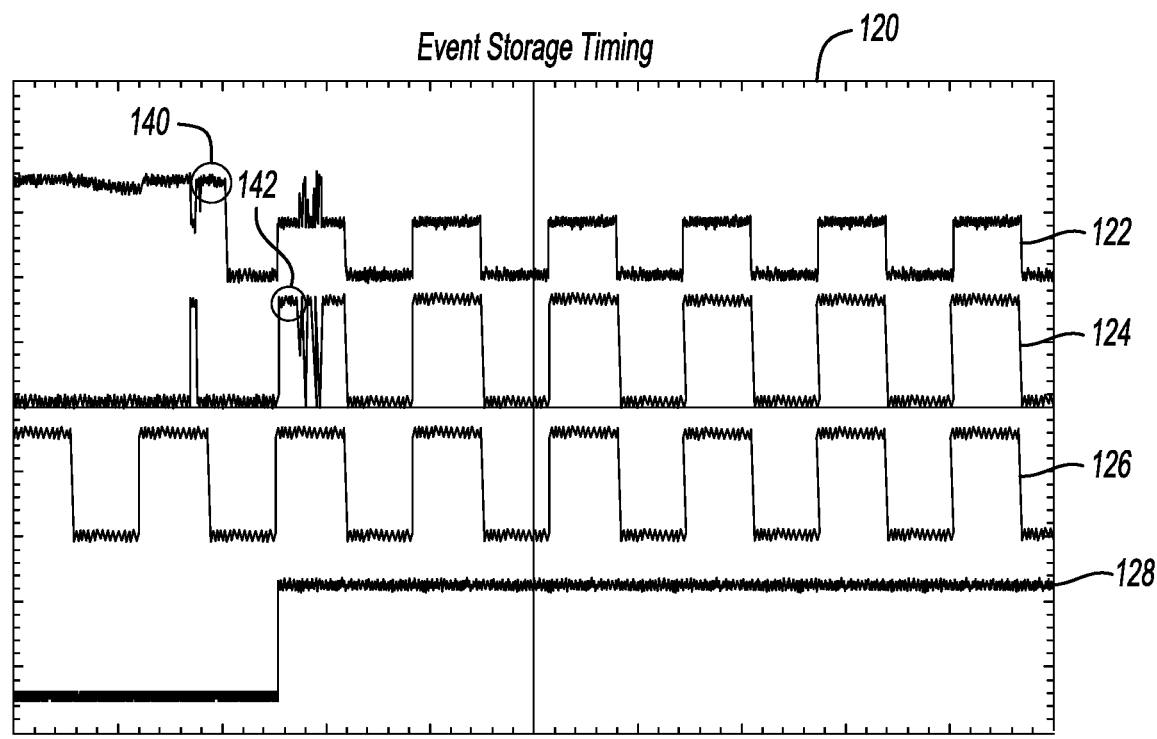
FIG. 2 depicts a plot of various waveforms corresponding to various signal inputs to an event storage circuit in accordance to one embodiment.

FIG. 2 depicts a plot 120 of various waveforms corresponding to various signal inputs to the apparatus 10 and the corresponding impact to the event storage circuit in accordance to one embodiment. As shown, waveform 122 corresponds to signal PROXIMITY as provided from the switch 22 to the detection circuit 14. Waveform 124 corresponds to a signal that is being provided to the flip-flop circuit 34 at input "D" of the event storage circuit 18. Waveform 126 corresponds to a signal that is provided to input "CLK" (i.e., clock input or the clock signal) to the flip-flop circuit 34. Waveform 128 corresponds to a signal that is provided from output "Q" at the flip-flop circuit 34.

As illustrated at point 140, the switch 22 provides a transition from a rising edge to a falling edge. This condition corresponds to the case in which the cordset 21 is coupled to both the vehicle 12 and to the external power source 23 for charging one or more batteries 53 in the vehicle 12. At point 142, the output from the detection circuit 14 goes high (e.g., the comparator 26 outputs a high output) which is then fed to the input "D" of the flip-flop circuit 34. For each pulse of the clock signal that goes high, the corresponding input that is provided the input "D" of the flip-flop circuit 34 is registered. As can be seen at waveform 128, the output "Q" from the flip-flop circuit 34 goes high as soon as the signal PROXIMITY transitions from the rising edge to the falling edge.

Figure 3:
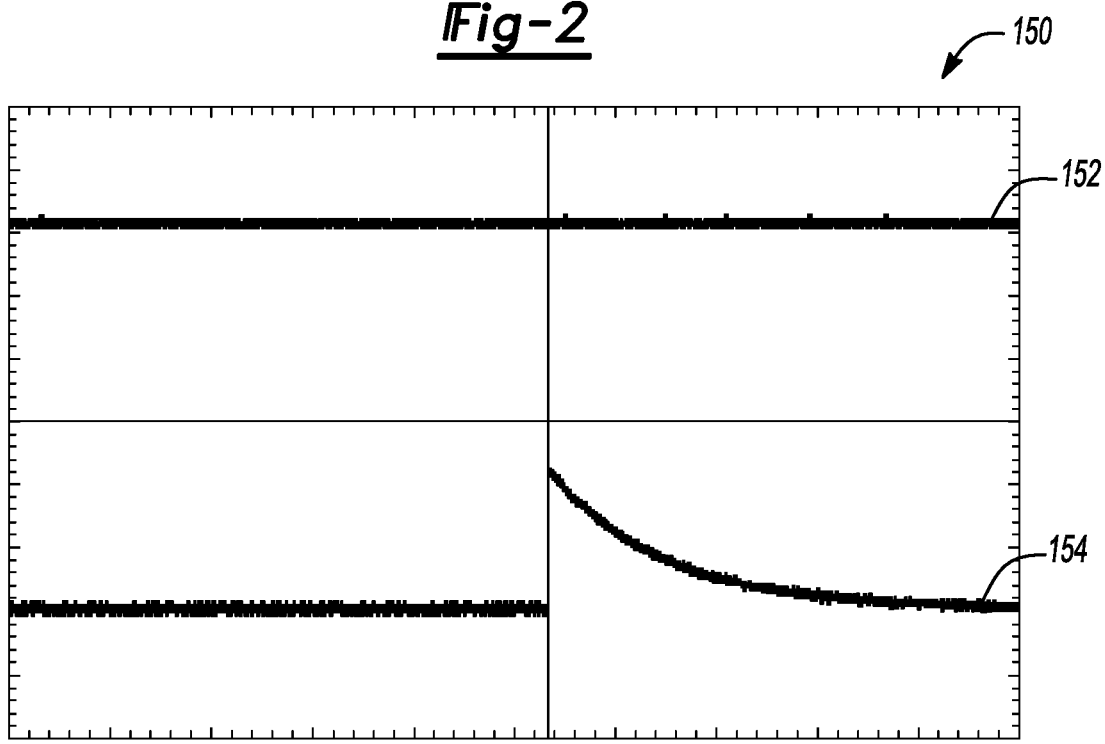
FIG. 3 depicts a plot of a waveform that generates a wake up event for a microcontroller in accordance to one embodiment.

FIG. 3 depicts a plot 150 of waveforms that generates a wake up event for a microcontroller (not shown) in accordance to one embodiment. As shown, waveform 122 corresponds to signal PROXIMITY as provided from the switch 22 to the detection circuit 14. In general, the apparatus 10 is capable of detecting a connection and disconnection of the cordset 21. As such, either a rising or falling waveform can be used. Waveform 154, for example, corresponds to a wakeup event at a microcontroller as the signal PROXIMITY transitions from the rising edge to the falling edge. As noted above, such a transition in this example corresponds to the switch 22 being closed which indicates that the cordset 21 has been connected to the vehicle 12 and to the external power source 23 for purposes of charging the vehicle 12.

Figure 4:
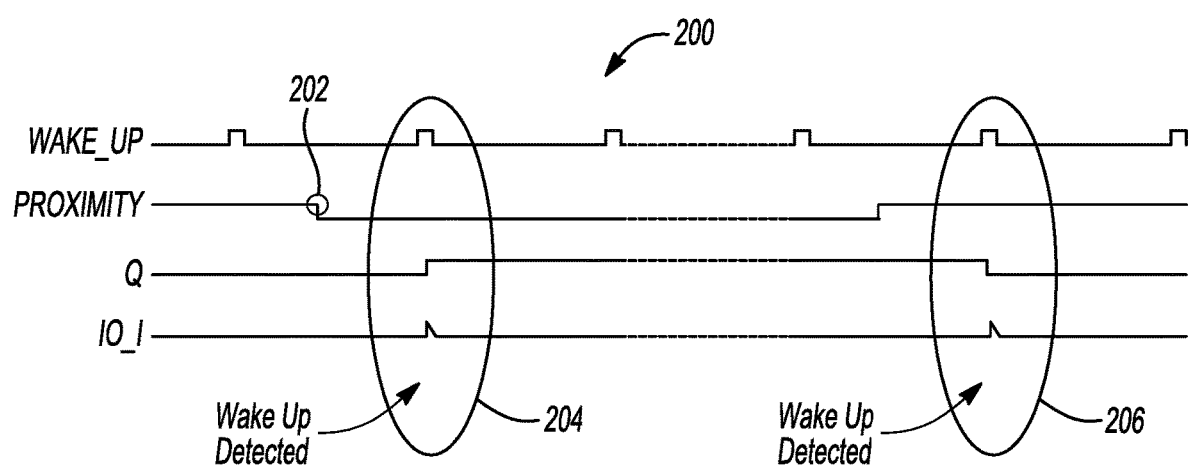
FIG. 4 depicts a plot of various waveforms that are provided to the apparatus in accordance to one embodiment.

FIG. 4 depicts a plot 200 of various waveforms that are provided to the apparatus 10 in accordance to one embodiment. As seen, the signal WAKE_UP is high at predetermined intervals to power (or strobe) various portions of the apparatus 10 to minimize current consumption. At point 202 on the signal PROXIMITY, a transition can be seen from a rising edge to a falling edge. This condition corresponds to a change in electrical resistance, or the switch 22 being toggled to reflect that the cordset 21 is electrically coupled to the vehicle 12 and to the external power source 23. Point 204 corresponds to a point in time in which the wakeup event (i.e., the cordset 21 is connected to the vehicle 12 and to the external power source 23). The detection circuit 14 detects the event and provides a high output which is received at input "D" of the flip-flop circuit 34 at the next rising edge on the signal WAKE_UP. The flip-flop circuit 34 in turn outputs a rising edge on the output "Q" (see signal Q in FIG. 6). The pulse generator circuit 20 provides a signal IO_1 including a voltage pulse for waking one or more microprocessors in the vehicle 12. Once the proximity event is detected (i.e., the cordset 21 is connected to the vehicle 12 and to the external power source 23), the one or more microprocessors wake up the vehicle 12 (or other vehicle electronics) to initiate a charging session.

As shown, the signal Q remains high until another wakeup event is detected (see point 206). Prior to point 206 on the plot 200, it can be seen that the signal PROXIMITY transitions from a falling edge to a rising edge. This condition exhibits that the cordset 21 has been disconnected from the vehicle 12 and/or the external power source 23. The switch 22 transmits the signal PROXIMITY that illustrates the above noted condition. The detection circuit 14 detects the event and provides a low output which is received at input "D" of the flip-flop circuit 34 at the next rising edge on the signal WAKE_UP. The flip-flop circuit 34 in turn outputs a falling edge on the output "Q" (see signal Q in FIG. 6). The pulse generator circuit 20 provides the signal IO_1 including a voltage pulse for alerting the one or more microprocessors in the vehicle 12 that the vehicle is no longer being charged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A proximity detection apparatus comprising:
   a detection circuit configured to:
   receive, at a first input, a proximity signal indicative of a first voltage level;
   receive, at a second input, a reference signal indicative of a second voltage level, the first input being different than the second input;

receive a wake up signal at predetermined intervals;

compare the first voltage level to the second voltage level in response to the wake up signal; and generate a first output indicative of an external power source being electrically coupled to a vehicle to charge one or more batteries in the vehicle based on the comparison of the first voltage level to the second voltage level;

a flip-flop circuit configured to store the first output in response to a clock signal; and a hold circuit configured to store the first output prior to the flip-flop circuit storing the first output.

2. The proximity detection apparatus of claim 1 wherein the detection circuit includes a comparator configured to compare the first voltage level to the second voltage level in response to the wake up signal.

3. The proximity detection apparatus of claim 2 wherein the comparator is further configured to receive the wake up signal at the predetermined intervals while the vehicle is in a sleep mode and to compare the first voltage level to the second voltage level while the vehicle is in the sleep mode.

4. The proximity detection apparatus of claim 2 wherein the comparator is further configured to generate the first output indicative of the external power source being electrically coupled to the vehicle in response to the first voltage level being less than the second voltage level.

5. The proximity detection apparatus of claim 1, wherein the flip-flop circuit includes a D flip flop.

6. The proximity detection apparatus of claim 1, wherein the hold circuit includes a diode circuit to store the first output before a rising edge of the clock signal is received at the flip-flop circuit.

7. The proximity detection apparatus of claim 1, wherein the hold circuit includes a diode circuit to store the first output before a falling edge of the clock signal is received at the flip-flop circuit.

8. The proximity detection apparatus of claim 1 further comprising a bypass capacitor configured to receive a second output from the flip-flop circuit as a single pulse to reduce current consumption.

9. The proximity detection apparatus of claim 8 wherein the second output is indicative of the external power source being electrically coupled to the vehicle to charge the one or more batteries in the vehicle.

10. A proximity detection apparatus comprising:

an event storage circuit configured to indicate that an external power source is coupled to a vehicle;

a detection circuit configured to:

receive, at a first input, a proximity signal indicative of a first voltage level;

receive, at a second input, a reference signal indicative of a second voltage level, the first input being different than the second input;

receive a wake up signal at predetermined intervals;

compare the first voltage level to the second voltage level in response to the wake up signal; and provide a first output indicative of the external power source being electrically coupled to the vehicle to charge one or more batteries in the vehicle to the event storage circuit in response to comparing the first voltage level to the second voltage level, wherein the event storage circuit includes a flip-flop circuit configured to store the first output in response to a clock signal, and a bypass capacitor configured to receive a second output from the flip-flop circuit as a single pulse to reduce current consumption.

11. The proximity detection apparatus of claim 10 wherein the detection circuit includes a comparator configured to compare the first voltage level to the second voltage level in response to the wake up signal.

12. The proximity detection apparatus of claim 11 wherein the comparator is further configured to receive the wake up signal at the predetermined intervals while the vehicle is in a sleep mode and to compare the first voltage level to the second voltage level while the vehicle is in the sleep mode.

13. The proximity detection apparatus of claim 11 wherein the comparator is further configured to generate the first output indicative of the external power source being electrically coupled to the vehicle in response to the first voltage level being less than the second voltage level.

14. The proximity detection apparatus of claim 10 wherein the flip-flop circuit includes a D flip flop.

15. A proximity detection apparatus comprising:

a flip-flop circuit;

a detection circuit configured to:

receive, at a first input, a proximity signal indicative of a first voltage level;

receive, at a second input, a reference signal indicative of a second voltage level, the first input being different than the second input;

receive a wake up signal at predetermined intervals;

compare the first voltage level to the second voltage level in response to the wake up signal; and provide a first output indicative of an external power source being electrically coupled to a vehicle to charge one or more batteries in the vehicle to the flip-flop circuit in response to comparing the first voltage level to the second voltage level, wherein the flip-flop circuit is configured to store the first output in response to a clock signal; and a hold circuit configured to store the first output prior to the flip-flop circuit storing the first output.

16. The proximity detection apparatus of claim 15 wherein the detection circuit includes a comparator configured to compare the first voltage level to the second voltage level in response to the wake up signal.

* * * * *